United States Patent [19]

Wilson

[11] Patent Number: 4,592,163
[45] Date of Patent: Jun. 3, 1986

[54] TELESCOPING CARTON AND INSECT TRAP

[75] Inventor: Donnie S. Wilson, Burlington, N.C.

[73] Assignee: Mebane Packaging Corporation, Mebane, N.C.

[21] Appl. No.: 749,727

[22] Filed: Jun. 28, 1985

[51] Int. Cl.⁴ .......................... A01M 1/20; B65D 5/35
[52] U.S. Cl. ......................................... 43/122; 43/107; 229/23 BT
[58] Field of Search .................. 43/107, 121, 122; 229/11, 23 BT; 220/8; 206/418, 486, 521, 583

[56] References Cited

U.S. PATENT DOCUMENTS

| | | | |
|---|---|---|---|
| 584,378 | 6/1897 | Lewis | 43/107 |
| 2,426,856 | 9/1947 | Berg | 229/11 X |
| 3,820,273 | 6/1974 | Novak | 43/122 X |
| 4,483,095 | 11/1984 | Webinger | 43/131 |

FOREIGN PATENT DOCUMENTS 34064   1/1965   Finland ............................... 206/418

Primary Examiner—Nicholas P. Godici
Assistant Examiner—Carmine Cuda
Attorney, Agent, or Firm—Charles R. Rhodes; Judith E. Garmon

[57] ABSTRACT

A multipurpose, collapsible carton formed of telescopically connected inner and outer members is used, in a preferred embodiment, as a disposable insect trap. The inner container member has closed bottom and side walls, and a funnel-shaped top wall. The outer cover member is telescopically mounted over the inner container and includes a closed top, open bottom, and side walls having open windows therein. When the carton is open insects are lured by bait to enter the windows, crawl down through the funnel into the container where they are trapped. When full, the carton is closed by slipping the cover down around the inner container, and the unit is discarded. When opened, the cover member remains attached over the inner member by a simple locking mechanism.

8 Claims, 6 Drawing Figures

TELESCOPING CARTON AND INSECT TRAP

BACKGROUND AND SUMMARY OF PRESENT INVENTION

The present invention falls in the class of a multipurpose carton or container of the type having an inner container member slidably or telescopically enclosed in an outer cover member. The present invention, however, moves beyond the conventional container of this type and further includes a construction within the container portion that is useful in myriad ways.

In the prior art, the larger number of such two-part containers or cartons are found to comprise a simple container portion that is primarily a box which slips into a tubular sleeve or cover portion. Such containers are quite adequate for storage, shipping and other handling of a variety of articles, but when it comes to such handling of certain fragile products, or to using the containers for other purposes than mere article handling, the traditional containers fall short. Most such containers are not useful for both shipping and display, functioning primarily for one or the other. Such is not true with the present invention.

One of the preferred embodiments of the present invention is constructed for use as a trap for flying insects such as Japanese beetles and Gypsy moths. Most existing traps are constructed so as to be emptied as the trap fills up and then used subsequently for an extended period of time. Many of the traps are made out of metal or plastic and are frequently somewhat expensive to produce and to ship. One approach taken to the construction of such a trap is disclosed in U.S. Pat. No. 4,442,624 wherein the housing is formed from a single sheet of stiffly flexible material such as coated cardboard or plastic. This trap is designed to be shipped flat and constructed on site. However, because of the multiple openings into the trap portion and the design of the openings, this type of trap is less desirable because there is a greater chance that the insects can escape.

The carton or container of the present invention is, in one preferred embodiment, designed to function as an insect trap which can be closed and discarded when filled. Because of the relatively inexpensive construction and the fact that it can be shipped flat and constructed on site, it functions in an extremely economical way. As described above, the inner container member is telescopically enclosed in the outer cover member to comprise the basic construction. However, the inner container member has a unique design and includes structure that functions in many environments. Both the inner and outer members are formed from individual blanks with each blank having a plurality of hingedly connected panels and flaps. As will be more fully described below, the inner container member has top, bottom and side walls with the top wall thereof being comprised of a funnel integrally formed with the container itself. The cone-shaped wall of the funnel is formed by a plurality of overlapping flaps which terminate in curved edges that form the bottom opening of the funnel. The side and bottom walls of the inner member are closed.

The outer member is also formed of a single blank and includes side walls, a closed top and an open bottom. The cover member is slidably mounted over the inner container member and is movable from a first closed position wherein it fully overlies the container, to a second extended or open position overlying only a portion of the inner member. In this second open position, the outer cover is telescopically extended over the inner member to a point where the cover engages only the upper portion of the container. In several of the embodiments, and particularly the one used as an insect trap, the side walls of the cover include cutout portions or windows which are open when the cover is in its second or open extended position. The windows serve as entrance ports for flying insects. A lure or bait is placed in the container and after the insects have entered through the windows, they are lured into the funnel and down through the opening in the end. Once they have been trapped in the container portion they cannot get out through the funnel. Once the container has been filled, the top is pushed to its closed position which seals the container and it can be discarded.

The above-described funnel configuration in the inner container portion also functions as a cushioning device for shipping and handling of fragile articles. The article is securely seated or position in the funnel, with a portion of the article extending through the bottom of the funnel, if possible, and when the cover member is placed thereover, the article is substantially protected from damage by dropping or jarring of the container. Such a container is particularly useful in the handling of electronic equipment, electrical supplies, and other fragile and delicate articles such as porcelains and Christmas ornaments.

A further use for the present container, in a small-scale version, is to contain room deodorizers. Solid type air fresheners and deodorizers are generally packaged in plastic packages that must stand on a shelf or other surface, or the deodorizers may be in packages which can be adhesively mounted on a closet wall or the like. The present carton allows for packaging the air freshener in a closed container until used. At that time, the outer cover member is pulled into its second open position, and the deodorizer which is mounted in the center of the inner container emits a fragrance through the windows of the cover member.

In all of the above mentioned embodiments, a unique and valuable feature of the present invention is a locking means that prevents the full removal of the cover member from the container or inner member. A tabular projection on the inner surface of the outer member engages a niche on the surface of the inner container to retain the cover member in a telescopically extended position.

A primary objective of the present invention is the provision of a multipurpose carton/container of the type described herein. Other and further objectives will become apparent as the following detailed description is studied in conjunction with the accompanying drawings.

DETAILED DESCRIPTION OF A PREFERRED EMBODIMENT

Figure 1:
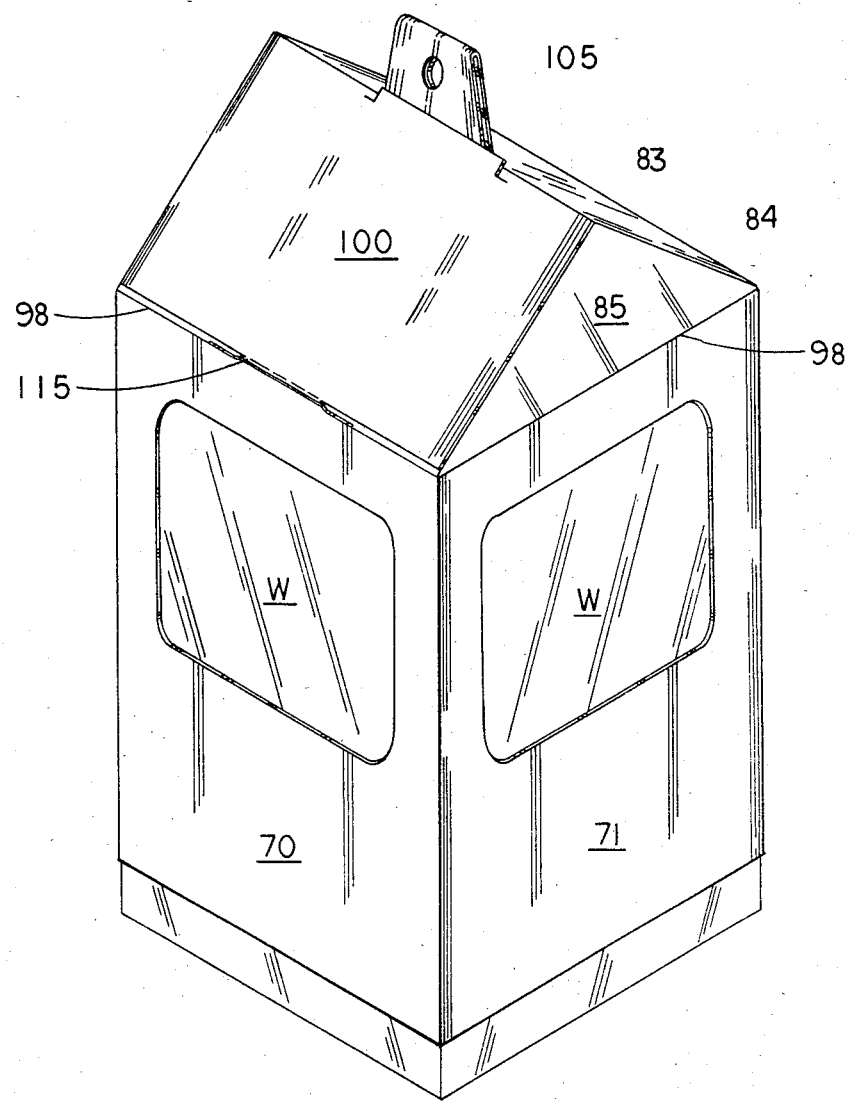
FIG. 1 is a perspective view of a preferred embodiment of the container in its closed condition.

Looking first at FIG. 1, the present invention is shown in one of the preferred embodiments. The container 10 is comprised of an inner container member 20 which is telescopically engaged in an outer cover member 40. FIG. 1 illustrates the cover member 40 in its first or normal position where it fully overlies the inner member 20. Other than when shipped in its flat, unerected condition, the box would normally be containing goods of some type and the overall appearance and structure of the container 10 would be as shown in FIG. 1. Depending upon the particular use, the structure could be modified according to size but is otherwise substantially the same.

Figure 2:
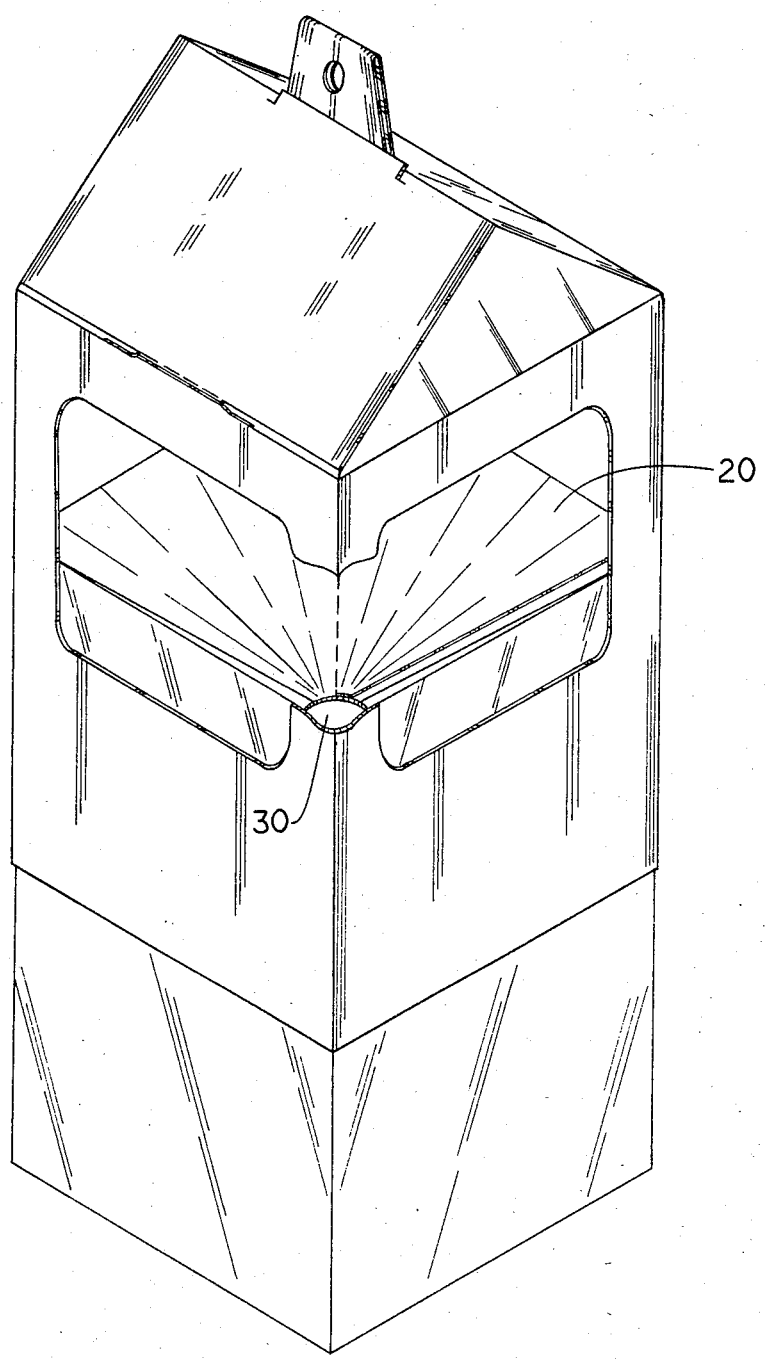
FIG. 2 is a perspective view of the container of FIG. 1 shown in the second, open position.

The embodiment shown in FIG. 2 is that of the insect trap and comprises the same inner container 20 and outer cover member described above. Looking into the container 20, a funnel 22 is an integral part of the container 20; the funnel being formed from a plurality of adjoining and overlapping flaps 24, 25, 26 and 27. An aperture or hole 30 is at the bottom of the funnel, and is formed by the arcuate or curved terminal edges of the flaps 24 through 27. The inner container is otherwise formed of side walls and a bottom wall.

The outer cover member 40 is comprised, generally, of an open bottom, side walls, and a top. In the embodiment illustrated each of the side walls includes a window opening W cut therethrough to provide either an entrance port for the insects or a viewing mechanism to see the contents of the package. The top is formed integrally with the side walls and is formed from a plurality of adjoining panels and overlapping flap. An optional means for hanging the container is supplied in this embodiment. In other embodiments, the hanging means might be omitted.

Figure 5:
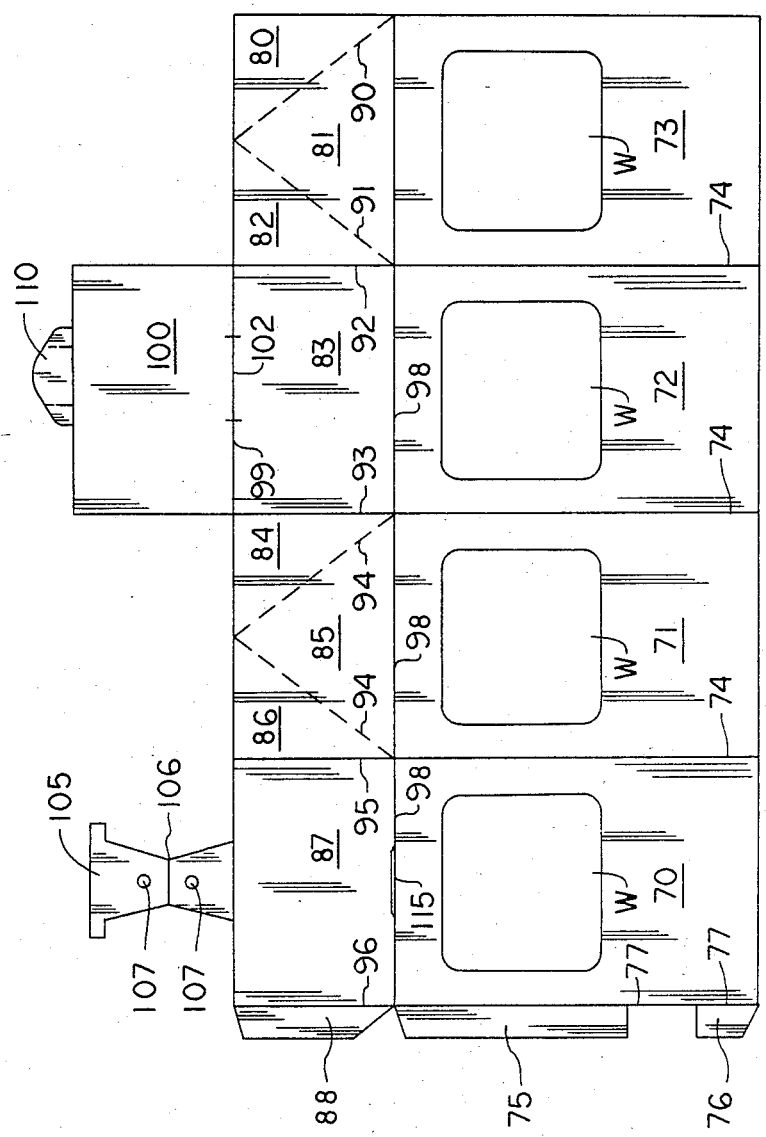
FIG. 5 is a plan view of the blank from which the outer cover member is formed.

Looking at FIG. 5 which is a plan view of the blank which forms the inner carton, the funnel portion 20 is shown to be comprised of a first group of overlapping panels 24,25,26,27, with two glue flaps 28 and 29. When the box is erected, glue flap 28 overlies panel 24, and glue flap 29 overlies panel 26. The glue flaps 28 and 29 are separated from panels 25 and 27 by fold lines 31 and 32 respectively.

This first group of panels is joined along one edge to the panels that form the side walls of the container. This second group of panels is formed of adjoining panels 33,34,35,36. They are joined by fold lines 37. Side panel 36 is joined to glue flap 39 by fold line 38. A small extension flap 40 is joined to side panel 33 and forms a locking member which will be described hereinafter for securing the inner and outer portions of the container together. A third group of panels forms the bottom of the inner container. This third group comprises panels 51,52,53,54, along with glue flaps 55 and 56. Glue flap 55 is joined to panel 54 along fold line 58 and glue flap 56 is joined to panel 52 along fold line 57. The group of side panels 33–36 are joined to the group of panels 24–27 and 51–54 along continuous fold lines 59 and 59' respectively. When constructed, the panels are folded along each of the fold lines into a square configuration with glue flap 39 underlying panel 33 with the extension flap 40 extending freely outwardly. Glue flaps 28,29,55 and 56 overlie panels 25,26,53 and 51 respectively.

Looking next at FIG. 5, the blank which forms the outer cover member is illustrated. A first group of elongated panels 70,71,72 and 73 form the side walls of the outer cover. As shown, the window W cut into each panel can be left open or may have a thin sheet of transparent plastic film overlying the cutout to form the window. The panels 73,72,71 and 70 are joined to each other along fold lines 74, and side wall or panel 70 is joined to glue flaps 75 and 76 by fold line 77. A portion between glue flaps 75 and 76 is removed and forms a part of the locking device which will be described fully below. A second group of panels forms the top of the cover member. This second group is made up of panels 80,81,82,83,84,85,86,87 and glue flap 88. Panels 80 and 82 are joined to panel 81 along perforated fold lines 90 and 91. Panel 82 is joined to panel 83 along fold line 92, and 83 is joined to 84 along fold line 93. Panels 84 and 86 are joined to panel 85 along perforated fold lines 94. Panel 86 is joined to 87 along fold line 95, and 87 is joined to glue flap 88 along fold 96. The group of side panels 70-73 are joined to the second group of panels 80-87 along continuous fold line 98. A single panel member 100 is joined to panel 83 along fold line 99 and forms an overlying outer cover for panel 87 when the top is constructed. Fold line 99 includes an intermediate portion that is severed or cut completely through to form a slot 102 which receives hanging tab 105 therethrough. A tabular member 110 is inserted through slot 115 which is cut through a portion of fold line 98 between panels 70 and 87.

When the top is constructed the folds are made along fold lines 74 and 77 such that glue flaps 75 and 76 underlie the face surface of panel 73. The second group of panels, forming the top, are folded such that panels 81 and 85 are pushed inwardly toward the center of the box with glue flap 88 underlying panel 80. So folded, panels 83 and 87 will be positioned opposite each other and panel 100 is folded down to overlie panel 87. The hanging member 105 is folded along fold 106 such that the apertures 107 therein are aligned. The folded tab is then inserted through slot 102 as shown in FIG. 1. Tabular member 110 is then inserted through slot 115 to hold the cover 100 in place. So erected, the outer cover member is in a condition to receive the inner container member telescopically therein.

Figure 3:
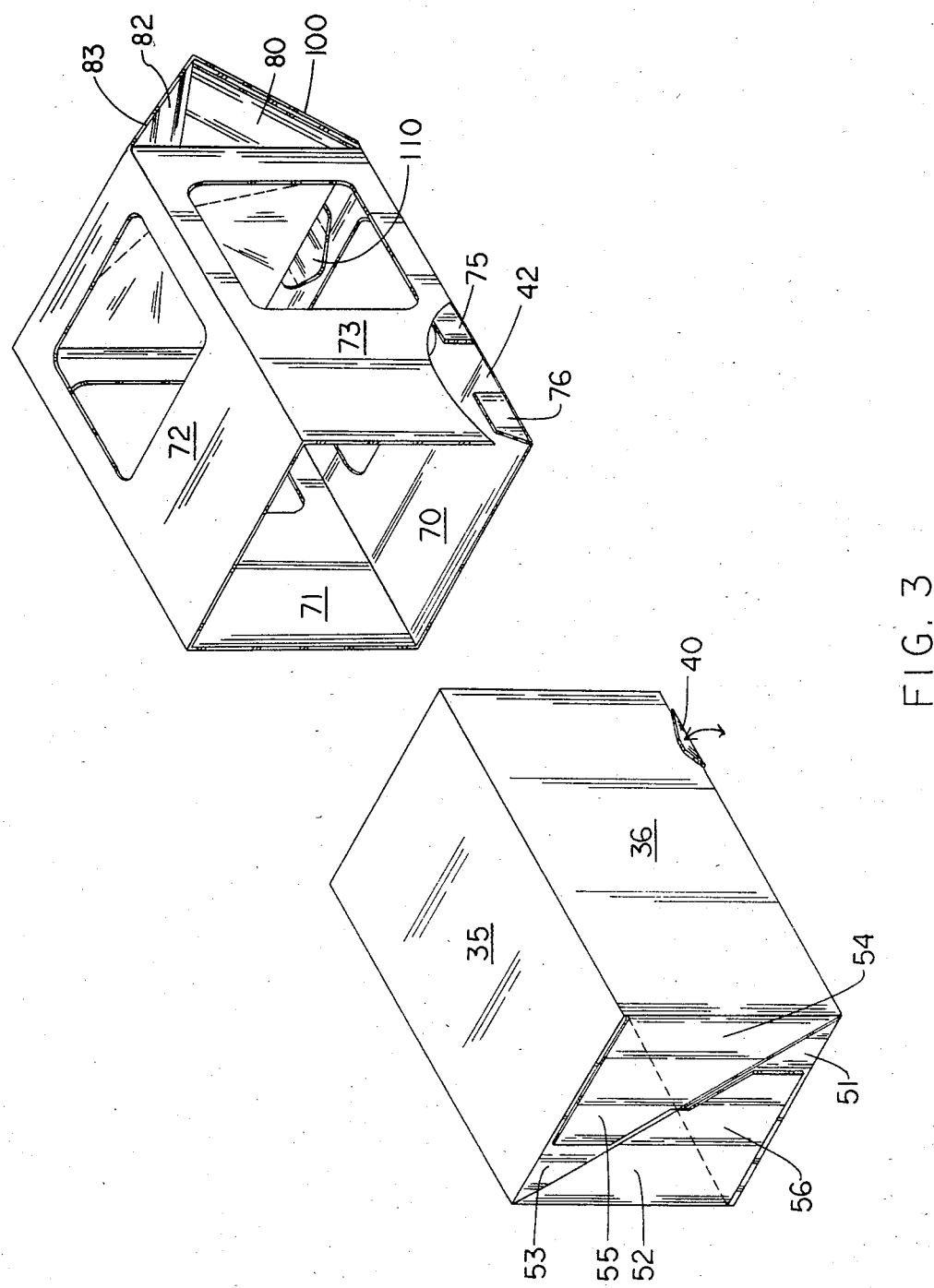
FIG. 3 is an exploded perspective illustrating the interior surfaces of the container and the locking means.
Figure 4:
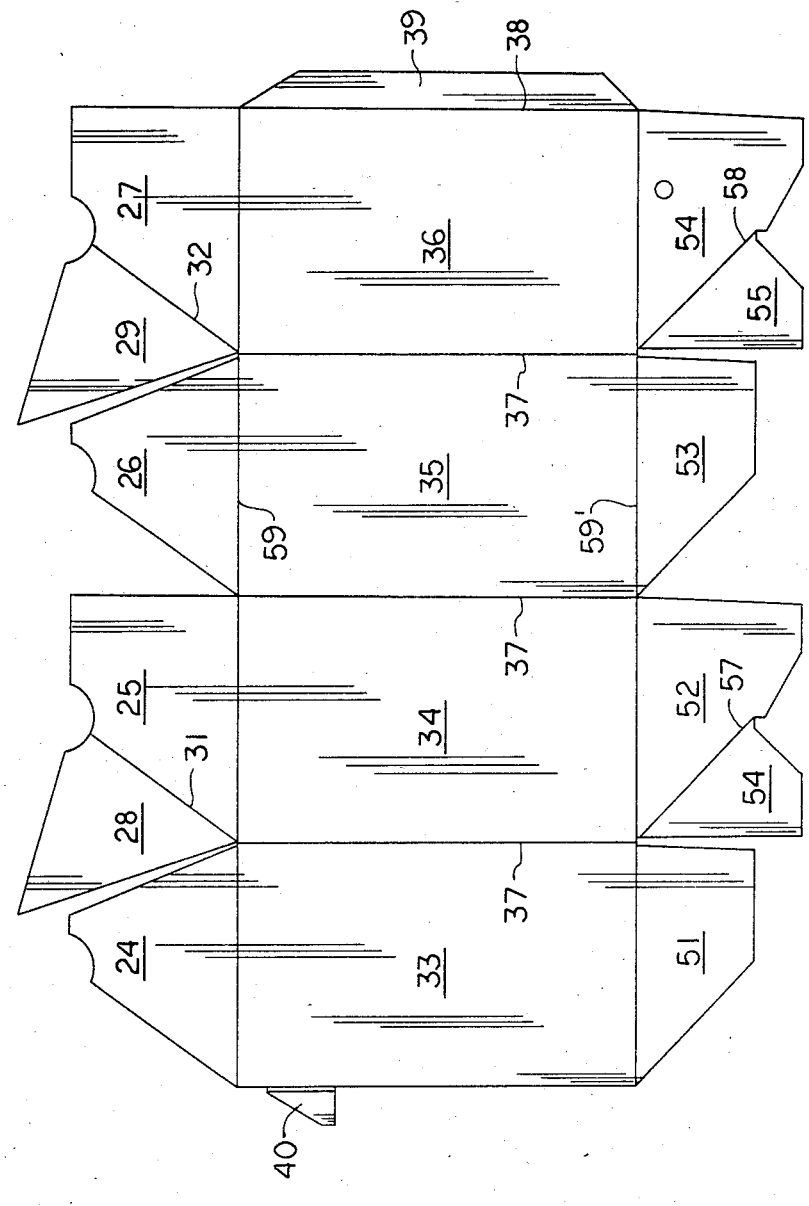
FIG. 4 is a plan view of the blank from which the inner container is formed.

Looking next at FIG. 3, the locking device is shown as comprising the freely extending flap 40 on the inner container portion and the open portion forming a niche 42 between glue flaps 75 and 76 of the outer cover member. When the inner portion is telescopically inserted in the outer cover member, the flap 40 slips into the niche 42 and holds the members together in a substantially open position where the contents of the container can be seen through windows W or in the trap embodiment, where the flying insects can enter the windows W and enter the trap through the funnel 20. The locking device does not prevent the container members being separated under application of minor pressure, but the locking device does hold the members together under their own weight. When it is desired to close the box by pushing the cover member into a position fully overlying the inner container member, a minor pressure overcomes the locking member and the container can be closed.

Figure 6:
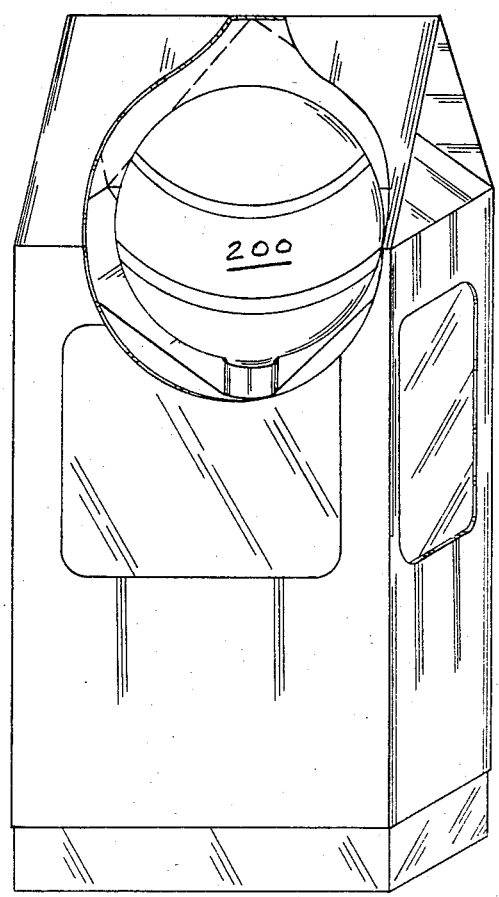
FIG. 6 is a perspective view of an alternate preferred embodiment.

FIG. 6 illustrates the container when used for packaging various types of objects, the one shown being a fragile ornament 200. The ornament may be suspended in the box or the ornament hanger may be securely seated in the funnel 20 as shown.

As previously mentioned the container can be modified in size and overall dimension to contain a variety of objects. When used as an insect trap, the erected container is opened to its fully extended position such that the flying insects can enter the windows W (which do not have a film covering) and proceed down through the funnel 20 into aperture 30, at which point they are trapped in the container. The container is preferably constructed of a heavy weight durable paper board material with a moisture resistant coating thereon. So constructed, it will withstand normal use in weather, and it has been found that when exposed to rain the water drains out of the container and it dries quickly. When the trap is filled with insects, the cover member is closed fully over the inner container and the trap is discarded. Other modifications might be made to the container described hereinabove while remaining within the scope of the claims below.

What is claimed is:

1. A rectangular parallelepiped, collapsible, multipurpose carton comprising:
   (a) an inner, container member having top, bottom and side walls formed from a single integral blank; said side walls comprising a plurality of rectangular panels joined along hinge lines at each side edge to corresponding side edges of adjacent panels; said bottom wall being comprised of a first plurality of inwardly folded, overlapping panels joined along hinge lines at the top edges thereof to corresponding bottom edges of said side walls; said top wall comprising a funnel formed of a second plurality of overlapping panels joined along hinge lines at the bottom edges thereof to corresponding top edges of said side walls; said second plurality of overlapping panels, when folded to an erect position, forming said funnel;
   (b) an outer, cover member having side walls, an open bottom, and a closed top and being formed from a single blank having a plurality of hingedly connected panels; said cover being slidably mounted over the funnel end of said container member; said cover being movable from a first closed position fully overlying said container member, to a second extended or open position overlying only a portion of said inner member;
   (c) said cover member further including at least one opening in a side wall adjacent the upper end thereof for access to or inspection of said funnel of said container when said outer cover member is in the second extended position.

2. The multipurpose carton according to claim 1 and further including a locking means for selectively retaining said cover member in said second position.

3. The multipurpose carton according to claim 2 wherein said locking means includes:
   (a) a tab formed integral to the free side edge of one of said rectangular panels forming said side walls of said inner member and, when erected, said tab lying outside of the planar surface of the adjacent side panel;
   (b) a niche formed integral to the free side of one of said hingedly connected panels forming the side walls of said cover member, said niche lying inside the planar surface of the adjacent side panel in confronting relation to said tab when said cover member is in said second open position.

4. A multipurpose carton according to claim 1 wherein said second plurality of panels which form said funnel comprises a plurality of irregularly shaped panels with each having a base side which is joined to one of the upper edges of the side walls of said inner container member along a common fold line; each of said funnel panels having a narrow side opposite said base side and each narrow side having a curved cutout therein which forms a curved edge lying opposite to said base; a pair of glue flaps, with each of said glue flaps being integrally joined by a fold line to side edges of alternate ones of said funnel forming panels; each flap having one curved edge which is continuous with said curved edge of the one of said funnel panels to which said flap is joined; whereby the adjacent curved edges of the adjoining panel and flap form an arc, and the combined curved edges form the opening in the bottom of said funnel when erected.

5. A multipurpose carton according to claim 1 and further including means associated with the top wall of said cover member for suspending said carton from a supporting structure.

6. A disposable trap for flying insects including:
   (a) a two-part, telescopically engaged housing having a first, inner container member with a second, outer cover member slidably mounted thereover;
   (b) said inner container having a closed bottom, adjoining side walls, and a funnel-shaped, substantially closed top; said funnel top having an opening at the bottom thereof for insects to enter therethrough;
   (c) said outer member including an open bottom for receiving said inner container, adjoining side walls, and a closed top; at least one of said side walls including a window therein serving as an entry port for flying insects;
   (d) said outer cover member being movable from a first closed position fully overlying said inner container, to a second open or extended position overlying only a portion of said inner member;
   (e) locking means for selectively retaining said cover in said second position;
   whereby flying insects are attracted to a lure contained within said inner container and trapped therein, and upon filling said inner container, said outer cover is pushed to said closed position and said trap is discarded.

7. A disposable trap according to claim 6 and further including:
   (a) said first, inner container being formed of a single integral blank with said side walls comprising a plurality of rectangular panels joined along hinge lines at each side edge to corresponding side edges of adjacent panels; said bottom wall being comprised of a first plurality of inwardly folded, overlapping panels joined along hinge lines at the top edges thereof to corresponding bottom edges of said side walls; said top wall comprising a funnel formed of a second plurality of overlapping panels joined along hinge lines at the bottom edges thereto corresponding top edges of said side walls; said second plurality of overlapping panels, when folded to an erect position, forming said funnel;
   (b) said second, outer cover member being formed from a single blank having a plurality of hingedly connected panels, and said funnel top comprised of a plurality of irregularly shaped panels with each having a base side which is joined to one of the upper edges of the side walls of said inner container member along a common fold line; each of said funnel panels having a narrow side opposite said base side and each narrow side having a curved cutout therein which forms a curved edge lying opposite to said base; a pair of glue flaps, with each of said glue flaps being integrally joined by a fold line to side edges of alternate ones of said funnel forming panels; each flap having one curved edge which is continuous with said curved edge of the one of said funnel panels to which said flap is joined; whereby the adjacent curved edges of the adjoining panel and flap form an arc, and the combined curved edges form the opening in the bottom of said funnel when erected.

8. A trap according to claim 1 and further including a means for suspending said trap from a supporting structure.

* * * * *